(12) United States Patent
De La Garza et al.

(10) Patent No.: US 8,534,759 B2
(45) Date of Patent: Sep. 17, 2013

(54) PASSENGER SEAT ARMREST RECLINE MECHANISM

(75) Inventors: Javier Valdes De La Garza, Doral, FL (US); Catalin Bunea, Fort Lauderdale, FL (US); Daniel Udriste, Coral Springs, FL (US)

(73) Assignee: BE Aerospace, Inc., Wellington, FL (US)

( * ) Notice: Subject to any disclaimer, the term of this patent is extended or adjusted under 35 U.S.C. 154(b) by 363 days.

(21) Appl. No.: 12/889,874

(22) Filed: Sep. 24, 2010

(65) Prior Publication Data

US 2012/0074751 A1 Mar. 29, 2012

(51) Int. Cl.
*B60N 2/34* (2006.01)

(52) U.S. Cl.
USPC .................. 297/354.13; 297/323; 297/411.31

(58) Field of Classification Search
USPC ............. 297/354.13, 323, 328, 411.3, 411.31
See application file for complete search history.

(56) References Cited

U.S. PATENT DOCUMENTS

| | | | |
|---|---|---|---|
| 5,108,148 A * | 4/1992 | Henke | 297/323 |
| 5,775,642 A | 7/1998 | Beroth | |
| 5,784,836 A | 7/1998 | Ehrick | |
| 6,352,309 B1 | 3/2002 | Beroth | |
| 6,695,406 B2 | 2/2004 | Plant | |
| 6,799,805 B2 | 10/2004 | Johnson | |
| 6,802,568 B1 | 10/2004 | Johnson | |
| 6,824,213 B2 | 11/2004 | Skelly et al. | |
| 6,899,397 B2 | 5/2005 | Johnson | |
| D505,796 S | 6/2005 | Johnson | |
| 7,029,215 B2 | 4/2006 | Dowty | |
| 7,055,904 B2 | 6/2006 | Skelly et al. | |
| 7,063,386 B2 | 6/2006 | Dowty et al. | |
| 7,066,551 B2 | 6/2006 | Johnson | |
| 7,083,234 B2 | 8/2006 | Dowty et al. | |
| 7,111,904 B2 | 9/2006 | Dowty et al. | |
| 7,131,698 B2 | 11/2006 | Dowty et al. | |
| 7,134,729 B2 | 11/2006 | Dowty et al. | |
| 7,261,378 B2 | 8/2007 | Dowty et al. | |
| 7,300,112 B2 | 11/2007 | Johnson | |
| 7,303,234 B2 | 12/2007 | Dowty et al. | |

(Continued)

FOREIGN PATENT DOCUMENTS

DE 101 61 422 A1 6/2003

OTHER PUBLICATIONS

International Search Report dated Nov. 30, 2011 for International PCT Application No. PCT/US2011/052884.

*Primary Examiner* — Anthony D Barfield
(74) *Attorney, Agent, or Firm* — Shumaker, Loop & Kendrick, LLP (57) ABSTRACT

A passenger seat includes a seat back pivotably connected to a seat pan assembly, an armrest pivotally connected to the seat back, and a main linkage pivotably connected to the seat pan assembly at a first pivot point defining a first pivot axis. The main linkage is interconnected to the seat back through a secondary linkage and the main linkage is also interconnected to the armrest through a guide member that travels within a guide slot carried on the armrest and defining a guide pathway. Inclination of the seat back with respect to the seat pan assembly pivots the main link about the first pivot axis with respect to the seat pan assembly, which vertically moves the armrest with respect to the seat pan assembly, and maintains an upper surface of the armrest in substantially parallel relation with the seat pan assembly.

15 Claims, 11 Drawing Sheets

(56) References Cited

U.S. PATENT DOCUMENTS

| | | |
|---|---|---|
| 7,341,309 B2 | 3/2008 | Penley et al. |
| 7,393,167 B2 | 7/2008 | Dowty et al. |
| 7,419,214 B2 | 9/2008 | Plant |
| 7,458,643 B2 | 12/2008 | Johnson |
| 7,506,930 B2 | 3/2009 | Penley et al. |
| 7,530,631 B2 | 5/2009 | Skelly et al. |
| 7,578,470 B2 | 8/2009 | Plant |
| 7,578,471 B2 | 8/2009 | Beroth |
| D611,260 S | 3/2010 | Plant |
| D613,516 S | 4/2010 | Plant |
| D614,413 S | 4/2010 | Plant |
| 7,721,991 B2 | 5/2010 | Johnson |
| 7,770,966 B2 | 8/2010 | Johnson |
| D622,988 S | 9/2010 | Alford |
| 7,850,238 B2 * | 12/2010 | Erb et al. .................. 297/354.13 |
| 2003/0080597 A1 | 5/2003 | Beroth |
| 2004/0004383 A1 | 1/2004 | Laurent |
| 2005/0127740 A1 | 6/2005 | Dowty |
| 2005/0151404 A1 | 7/2005 | Dowty et al. |
| 2005/0151405 A1 | 7/2005 | Dowty et al. |
| 2005/0179294 A1 | 8/2005 | Dowty et al. |
| 2005/0184569 A1 | 8/2005 | Penley et al. |
| 2005/0184571 A1 | 8/2005 | Dowty et al. |
| 2005/0194827 A1 | 9/2005 | Dowty et al. |
| 2005/0194828 A1 | 9/2005 | Johnson et al. |
| 2005/0225147 A1 | 10/2005 | Johnson |
| 2005/0248193 A1 | 11/2005 | Dowty et al. |
| 2005/0253436 A1 | 11/2005 | Dowty et al. |
| 2006/0006704 A1 | 1/2006 | Skelly et al. |
| 2006/0232117 A1 | 10/2006 | Johnson |
| 2006/0261655 A1 | 11/2006 | Dowty et al. |
| 2006/0263164 A1 | 11/2006 | Dowty et al. |
| 2007/0018494 A1 | 1/2007 | Gutosky, Jr. |
| 2007/0040434 A1 | 2/2007 | Plant |
| 2007/0145187 A1 | 6/2007 | Beroth |
| 2007/0158992 A1 | 7/2007 | Dowty et al. |
| 2007/0228794 A1 | 10/2007 | Penley |
| 2007/0262635 A1 | 11/2007 | Johnson |
| 2008/0061606 A1 | 3/2008 | Skelly et al. |
| 2008/0079303 A1 | 4/2008 | Penley et al. |
| 2008/0203227 A1 | 8/2008 | Beroth |
| 2009/0045665 A1 | 2/2009 | Dowty et al. |
| 2009/0121523 A1 | 5/2009 | Johnson |
| 2009/0302158 A1 | 12/2009 | Darbyshire |
| 2010/0032994 A1 | 2/2010 | Lawson |
| 2010/0116936 A1 | 5/2010 | Plant |
| 2010/0230540 A1 | 9/2010 | Dowty et al. |
| 2010/0253129 A1 | 10/2010 | Dowty et al. |
| 2010/0308167 A1 | 12/2010 | Hawkins et al. |
| 2010/0327634 A1 | 12/2010 | Johnson |

* cited by examiner

PASSENGER SEAT ARMREST RECLINE MECHANISM

TECHNICAL FIELD AND BACKGROUND OF THE INVENTION

1. Field of the Invention

The present invention relates generally to the field of aircraft and other passenger seat recline mechanisms, and more particularly, to an armrest recline mechanism which automatically adjusts the elevation of an armrest in relation to a seat bottom as a passenger seat moves between upright and lie-flat positions, and which maintains the armrest and seat bottom in substantially parallel relationship throughout the range of motion of the mechanism.

2. Background of the Invention

Premium class airline passenger seats are typically adjustable between upright and lie-flat positions to provide passenger comfort and comply with taxi, take-off and landing seating position requirements. Such passenger seats typically include a seat back and seat pan assembly, often linked in motion, supported by a frame and angularly adjustable by way of a seat recline mechanism. Conventional passenger seats typically include an adjustable or fixed armrest. While conventional seat recline mechanisms are able to achieve a transition from upright to lie-flat positions, they do not permit their armrests to remain in comfortable positions throughout their ranges of motion.

Accordingly, to overcome the disadvantages of conventional seat recline mechanism design, an armrest recline mechanism is described that positions an armrest in a comfortable position relative to a seat bottom and seat back throughout the range of motion of the seat bottom, seat back and armrest. In particular, the armrest recline mechanism maintains the armrest in substantially parallel relationship with the seat bottom as the seat bottom and seat back move between their upright seating positions and their lie-flat positions and as the armrest moves vertically with respect to the seat bottom.

BRIEF SUMMARY OF THE INVENTION

In one aspect, an aircraft passenger seat is provided, including seat and armrest mechanisms for driving movement of the seat and armrest between upright and lie-flat positions while maintaining the armrest in a complementary position with respect to the seat position.

In another aspect, an aircraft passenger seat is provided which is configured for infinite adjustment of the seat and armrest mechanisms between upright and lie-flat positions within the limits of the seat mechanism.

In another aspect, customization of the seat and armrest mechanism is achieved by rotation of a main linkage about a pivot axis that is fixed in position relative to a seat pan assembly throughout seat back movement.

In another aspect, rotation of the main linkage drives the travel of the armrest in cooperation with travel of the seat back and/or seat pan assembly.

To achieve the foregoing and other aspects and advantages, in one embodiment the present invention provides a passenger seat, including a seat back pivotably connected to a seat pan assembly and an armrest pivotally connected to the seat back; and a main linkage pivotably connected to the seat pan assembly at a first pivot point defining a first pivot axis that is fixed in position throughout seat back movement. The main linkage is further interconnected to the seat back through a secondary linkage and is connected to the armrest through a guide member that travels within a slot carried on the armrest defining a guide pathway. A change in a degree of inclination of the seat back with respect to the seat pan assembly causes pivoting movement of the main linkage about the first pivot axis with respect to the seat pan assembly, which in turn causes a change in a vertical position of the armrest with respect to the seat pan assembly. As the armrest moves vertically, a top surface of the armrest and the seat pan assembly remain substantially parallel with each other.

In a further embodiment, the armrest includes an armrest frame and an arm pad connected to the armrest frame.

In a further embodiment, the seat pan assembly includes a seat frame and a seat cushion connected to the seat frame.

In a further embodiment, the seat back includes a back frame and a back cushion connected to the back frame.

In a further embodiment, upper surfaces of the arm pad, the seat cushion and the back cushion are in the same plane when the passenger seat is in a lie-flat position.

In a further embodiment, a top surface of the seat pan assembly, a front surface of the seat back and a top surface of the armrest are in the same plane when the passenger seat is in a lie-flat position.

A further embodiment provides a passenger seat including a seat back pivotably connected to a seat pan assembly and an armrest pivotally connected to the seat back. A main linkage is pivotably connected to the seat pan assembly at a first pivot point defining a first pivot axis that is fixed in position throughout seat back movement. The main linkage is further interconnected to the seat back through a secondary linkage and is pivotably connected to the armrest at a second pivot point defining a second pivot axis. A change in a degree of inclination of the seat back with respect to the seat pan assembly causes pivoting movement of the main linkage about the first pivot axis with respect to the seat pan assembly, which in turn causes a change in a vertical position of the armrest with respect to the seat pan assembly.

In a further embodiment, the main linkage includes a first main linkage member pivotably connected to the seat pan assembly at the first pivot point and pivotably connected to the secondary linkage at a third pivot point defining a third pivot axis. A second main linkage member is pivotably connected to the armrest at the second pivot point and pivotably connected to the secondary linkage at the third pivot point. In a further embodiment, the first main linkage member, second main linkage member and secondary linkage are all pivotable about the third pivot axis.

Additional features, aspects and advantages of the invention are set forth in the detailed description which follows, and in part will be readily apparent to those skilled in the art from that description or recognized by practicing the invention as described herein.

BRIEF DESCRIPTION OF THE DRAWINGS

The present invention is understood when the following detailed description of the invention is read with reference to the accompanying drawings, in which.

DETAILED DESCRIPTION OF THE INVENTION

The present invention will now be described more fully herein with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

An armrest recline mechanism is described herein for use with an aircraft passenger seat generally including a seat back, a seat bottom having a seat pan assembly, and a base frame. The armrest recline mechanism generally functions to adjust the armrest in conjunction with a seat recline mechanism, cooperatively moving the seat and armrest between upright and lie-flat positions, with continuous adjustment therebetween. As used throughout the specification, the term "upright" seating position is used to describe a taxi, take-off and landing compliant seat back configuration, the term "reclined" seating position is used to describe a seating position in which the seat back is reclined relative to the upright seat back configuration, and the term "lie-flat" position is used to describe a configuration in which the seat back and seat bottom form a substantially flat and continuous surface.

Although some embodiments of the armrest recline mechanism are shown and described with reference to only a single side of the associated seat for purposes of clarity (i.e. the left side of the seat), it is understood that the seat preferably includes an armrest recline mechanism assembly positioned on each side of the seat and working in cooperation to adjust the seating position. Thus, the right side armrest recline mechanism assembly not shown may essentially be a mirror image of the left side armrest recline mechanism assembly shown. In a preferred embodiment, adjustment of a seat recline mechanism drives movement of the armrest recline mechanism.

Figure 1:
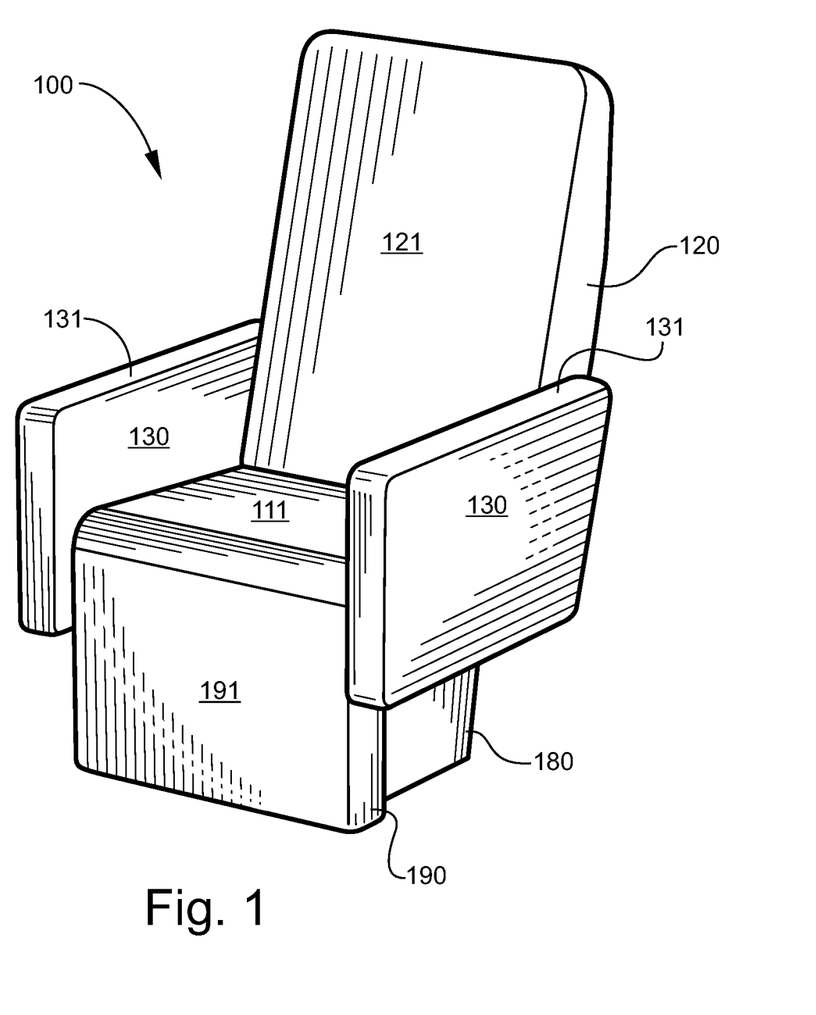
FIG. 1 illustrates an exterior perspective view of a passenger seat according to an exemplary embodiment in an upright seating position.

Referring to the figures, FIG. 1-5 illustrate exterior perspective views of a passenger seat 100 according to an exemplary embodiment. Referring now to FIG. 1, illustrating the passenger seat 100 in an upright position, the passenger seat 100 includes a seat pan assembly (110, shown in FIGS. 2-4 and 6-11) pivotably connected to a seat back 120 and to a base frame 180 at fixed pivot 175. The passenger seat also includes a pair of armrests 130 connected to the seat 100 via an armrest recline mechanism, described in detail below. The armrests are pivotally connected to the seat back 120 at arm pivot points 192. In this embodiment, the top surface of the seat pan assembly 110 includes a seat cushion 111. Similarly, a front surface of the seat back 120 includes a back cushion 121 and a top surface of each armrest 130 includes an armpad 131 in this embodiment. The passenger seat may also include a leg rest 190 having a front surface that may include a leg cushion 191. The seat pan assembly 110, seat back 120 and/or leg rest 190 are supported by the base frame 180 which includes a seat recline mechanism (not shown) of a type known in the art.

Figure 2:
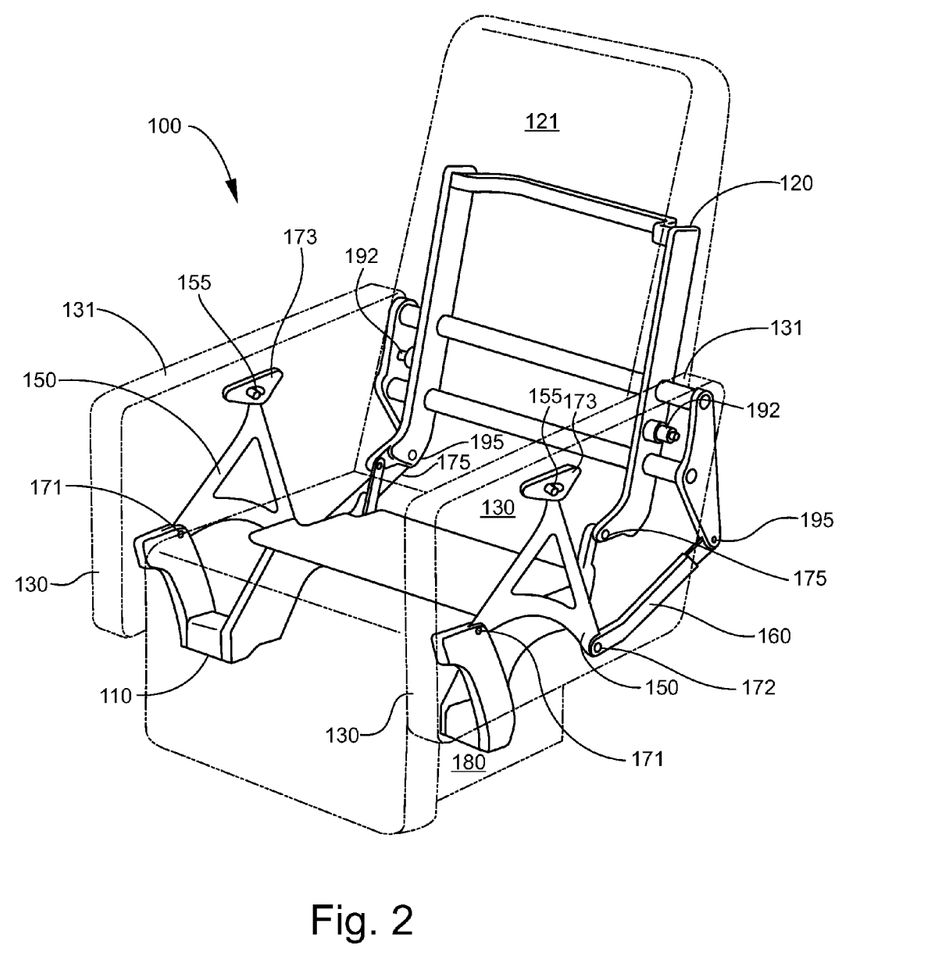
FIG. 2 illustrates a perspective view of the passenger seat of FIG. 1 showing internal components of the armrest recline mechanism.

Referring now to FIG. 2, a perspective view of the passenger seat 100 of FIG. 1 shows internal components of the armrest recline mechanism. For each armrest, a main linkage 150 is pivotably connected to the seat pan assembly 110 at a first pivot point 171 defining a first pivot axis. The main linkage 150 is further interconnected to the seat back 120 through a secondary linkage 160 and is connected to the armrest 130 through a guide member 155 that travels within a guide slot 173 carried on the armrest 130 defining a guide pathway. In an alternative embodiment, as a substitute for the guide member 155 and guide slot 173 connection, the main linkage 150 may be pivotably connected to the armrest at a second pivot point defining a second pivot axis. The secondary linkage 160 is connected to the main linkage 150 at a third pivot point 172 defining a third pivot axis, and is also connected to the seat back and a fourth pivot point 195. The seat back 120 and seat pan assembly 110 rotate about fixed pivot point 175 and move between upright, reclined and lie-flat positions with respect to the base frame 180 via a seat recline mechanism portion of the base frame 180 in a manner as is known in the art.

Figure 3:
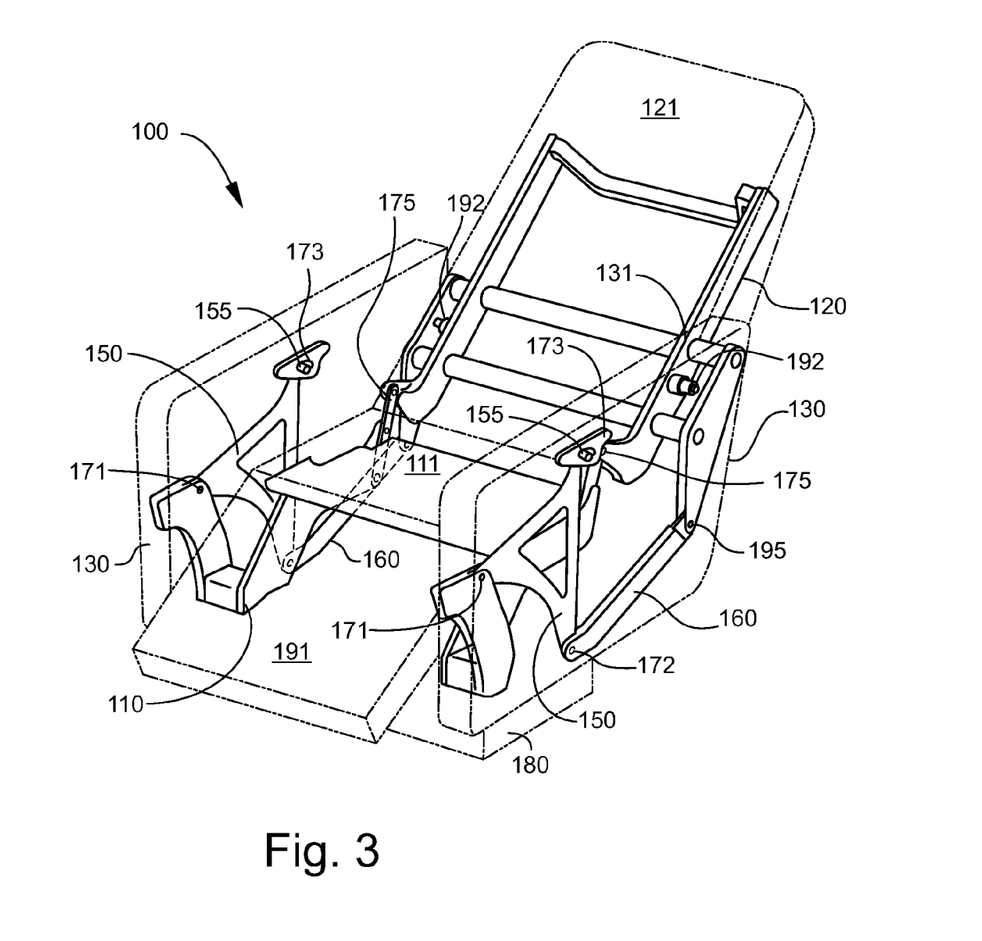
FIG. 3. illustrates a perspective view of the passenger seat of FIG. 1 in a reclined seating position showing internal components of the armrest recline mechanism.

Referring now to FIG. 3, a perspective view of the passenger seat of FIG. 1 in a reclined seating position shows internal components of the armrest recline mechanism. As the seat pan assembly 110 and seat back 120 pivot with respect to each other during operation of the seat recline mechanism, the main linkage 150 pivots about the first pivot axis with respect to the seat pan assembly 110, thereby causing vertical movement of the armrest 130 with respect to the seat pan assembly 110. In some embodiments, the guide slot 173 may be configured such that the top surface and/or armpad 131 of the armrest 130 does not rotate with respect to the base frame 180 during vertical movement of the armrest 130, but some degree of rotation of the armrest 130 may be desirable for the purposes of passenger comfort and/or ease of manufacture.

Figure 4:
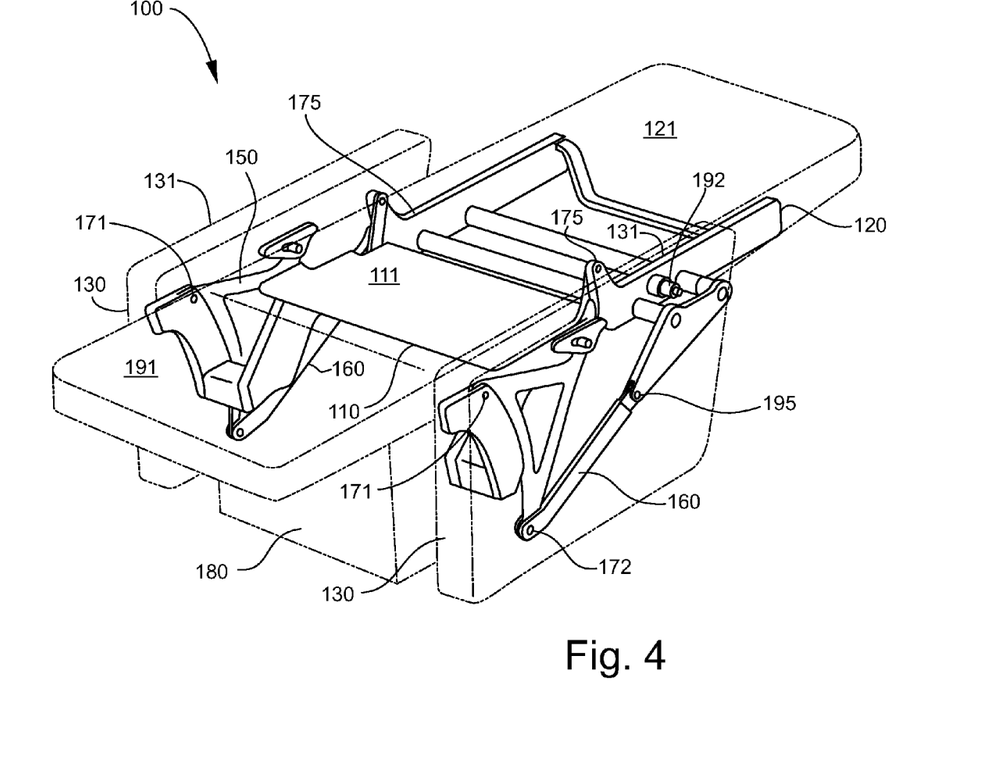
FIG. 4. illustrates a perspective view of the passenger seat of FIG. 1 in a lie-flat position showing internal components of the armrest recline mechanism.

Referring now to FIG. 4, a perspective view of the passenger seat 100 of FIG. 1 in a lie-flat position illustrates internal components of the armrest recline mechanism. As the seat 100 fully reclines into a lie-flat position, the main linkage 150 pivots to cause the top surface and/or arm pad 131 of the armrest 130 to be in substantially the same plane as the top surface and/or seat cushion 111 of the seat pan assembly 110 and the front surface and/or back cushion 121 of the seat back 120.

Figure 5:
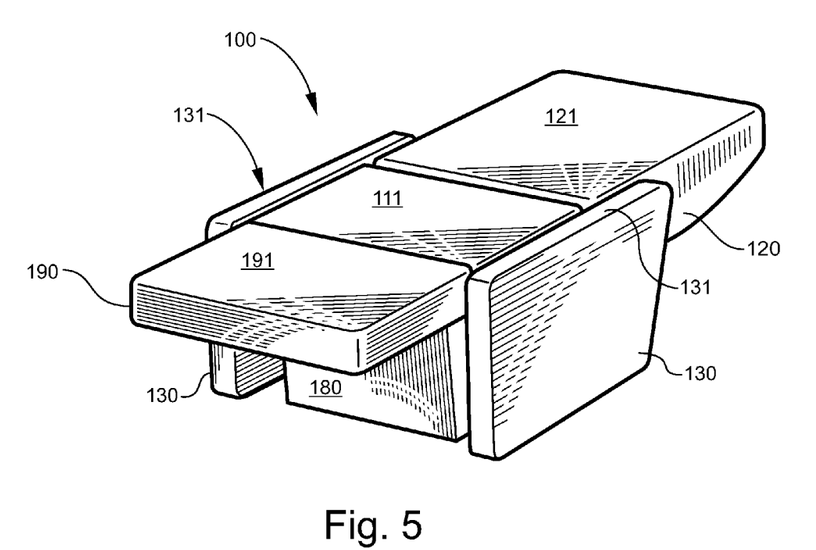
FIG. 5. illustrates an exterior perspective view of the passenger seat of FIG. 1 in a lie-flat position.

Referring now to FIG. 5, an exterior perspective view shows the passenger seat of FIG. 1 in a lie-flat position. In this and other embodiments, the leg rest 190 (having a top surface and/or leg cushion 191 in some embodiments) may rotate upward during operation of the seat recline mechanism to provide support for a passenger's legs in the reclined and lie-flat positions such that the leg cushion 191, seat cushion 111 and back cushion 121 combine to form a substantially flat surface.

Figure 6:
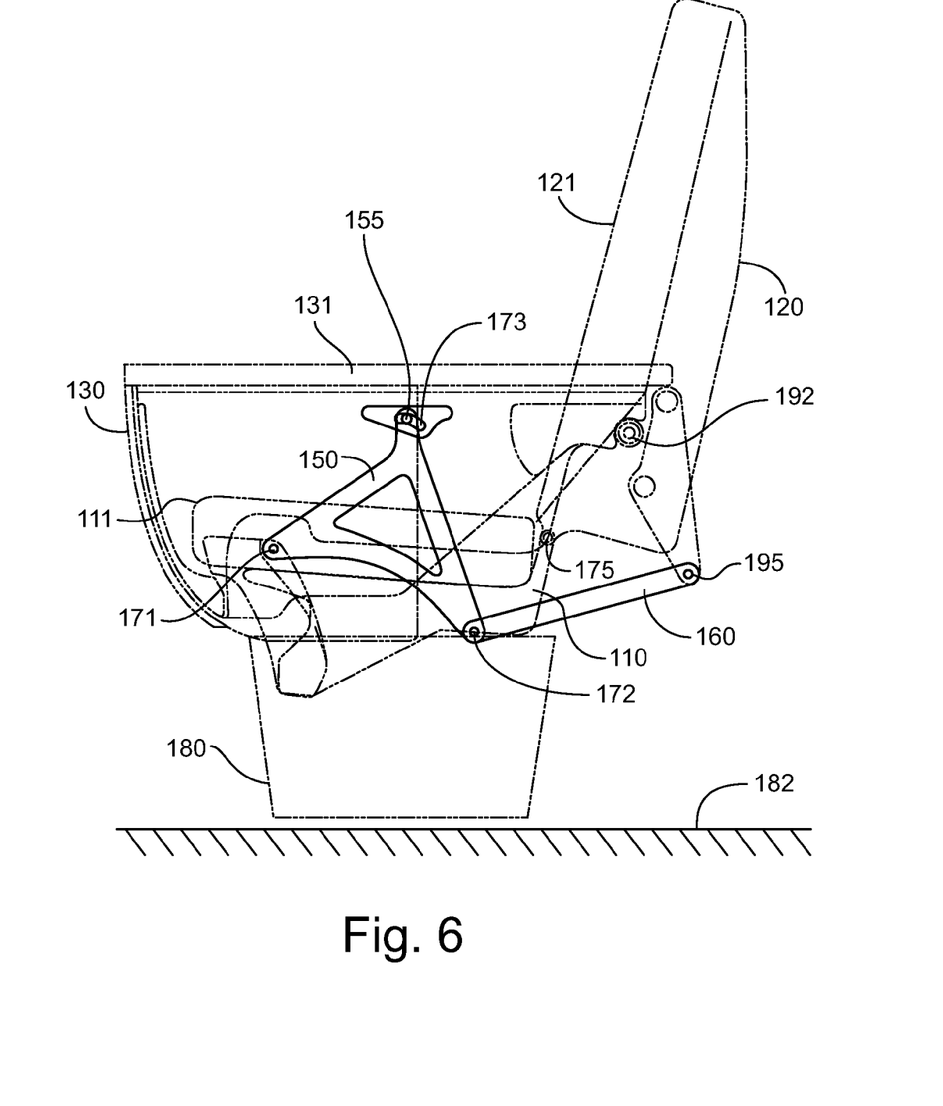
FIG. 6 illustrates a side elevation detail view of the armrest recline mechanism of FIG. 2 shown in an upright seating position.
Figure 7:
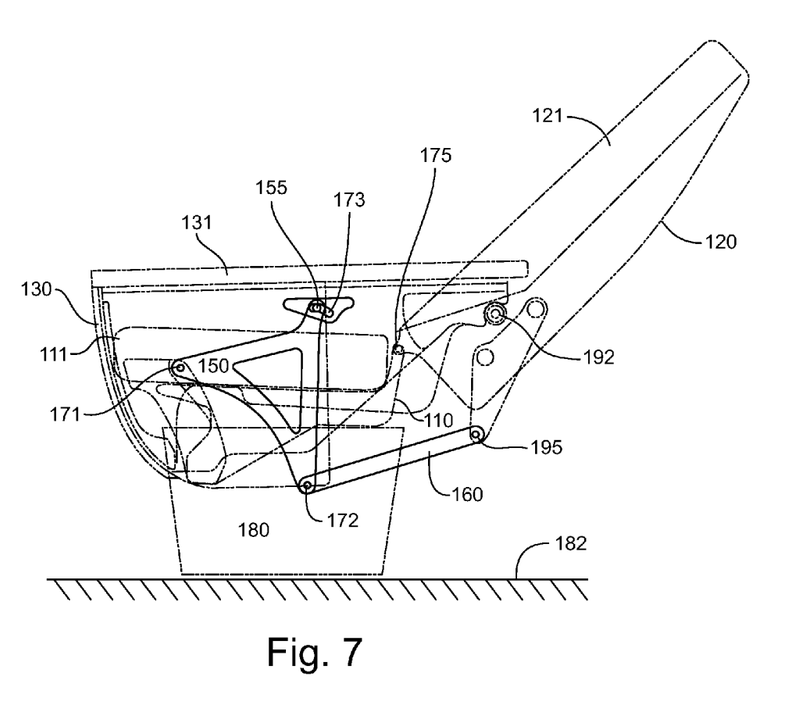
FIG. 7 illustrates a side elevation detail view of the armrest recline mechanism of FIG. 2 shown in a reclined seating position.
Figure 8:
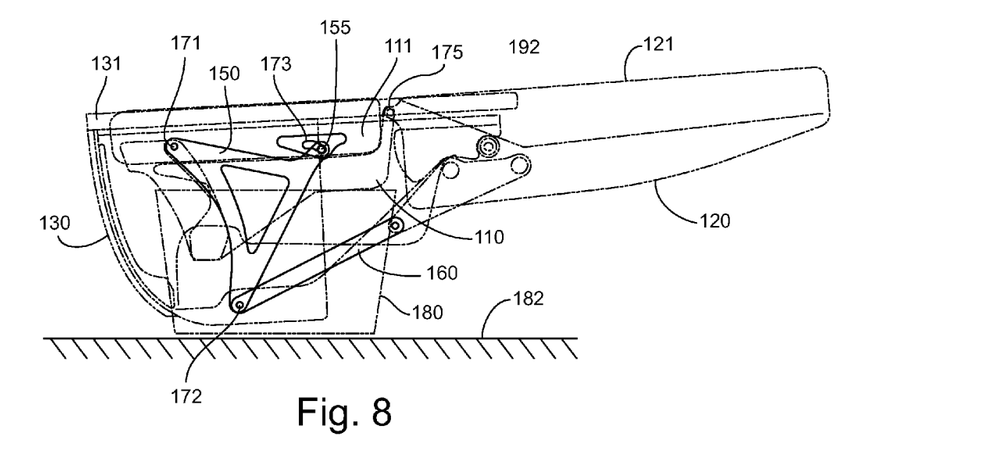
FIG. 8 illustrates a side elevation detail view of the armrest recline mechanism of FIG. 2 shown in a lie-flat position.

FIGS. 6-8 show a side elevation detail view of the armrest recline mechanism in respective upright, reclined and lie-flat positions. In these figures, the main linkage 150 and secondary linkage 160 are highlighted for clarity and emphasis, while some portions of the passenger seat 100, e.g., base frame 180, seat pan assembly 110, seat back 120, are deemphasized. Other portions of the passenger seat 100, e.g., the seat recline mechanism portion of base frame 180, are not shown to avoid confusion and unnecessary detail. As can be seen in FIG. 6-8, as the seat back 120 rotates with respect to the seat pan assembly 110, the armrest 130 moves vertically with respect to the seat pan assembly 110.

It should be noted that in this embodiment, the movement of the armrest 130 is driven by the pivoting movement of the seat back 120 with respect to the seat pan assembly 110. The seat pan assembly 110 may also rotate and/or translate with respect to the base frame 180 as well, but this is not necessary to the operation of the armrest recline mechanism. In this and other embodiments, the seat pan assembly 110 may be independently adjustable; for example, the seat pan assembly 110 may be pivoted upwardly with respect to the base frame 180 while the seat back 120 remains stationary with respect to the base frame 180. It should also be noted that the guide member 155 and guide slot 173 may be arranged to allow the seat back 120 to rotate freely with respect to the seat pan assembly 110 without being held in place by the geometry of the various linkages, and may also be arranged to maintain the armrest 130 at a substantial horizontal orientation with respect to the base frame 180 throughout movement of the seat back 120 and/or seat pan assembly 110.

Figure 9:
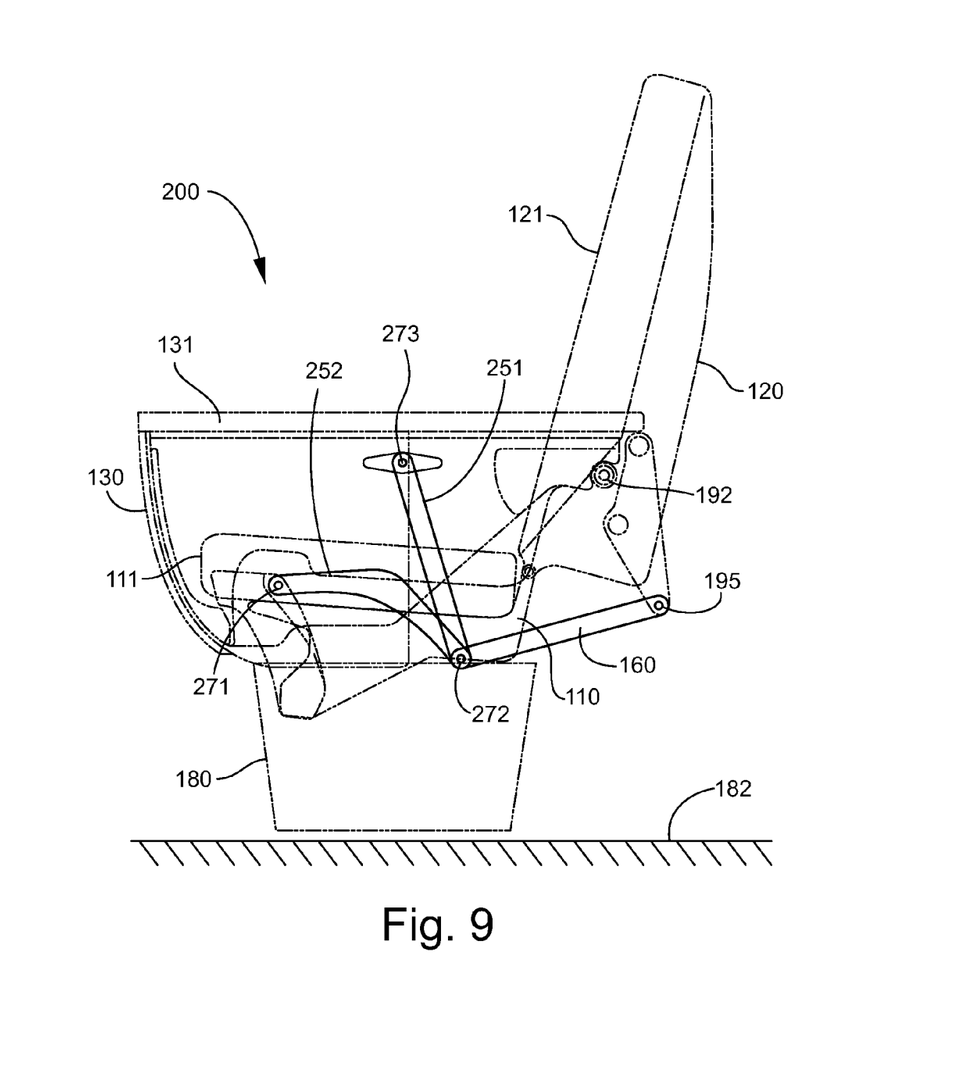
FIG. 9 illustrates a side elevation detail view of an armrest recline mechanism according to an alternate embodiment, shown in an upright seating position.
Figure 10:
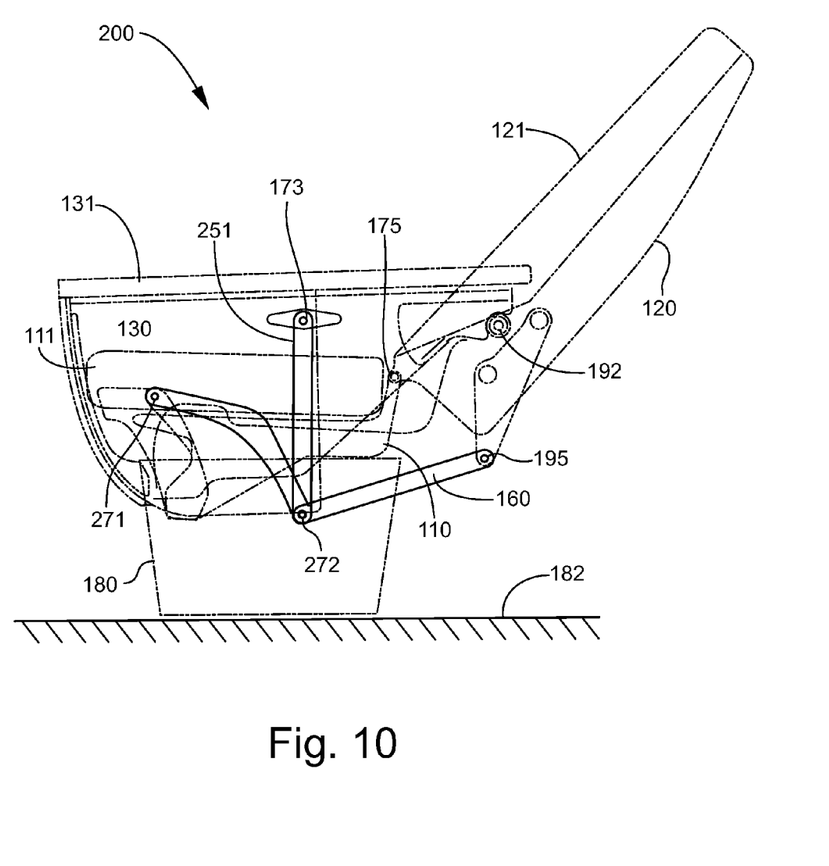
FIG. 10 illustrates a side elevation detail view of the seat recline mechanism of FIG. 9 shown in a reclined seating position.
Figure 11:
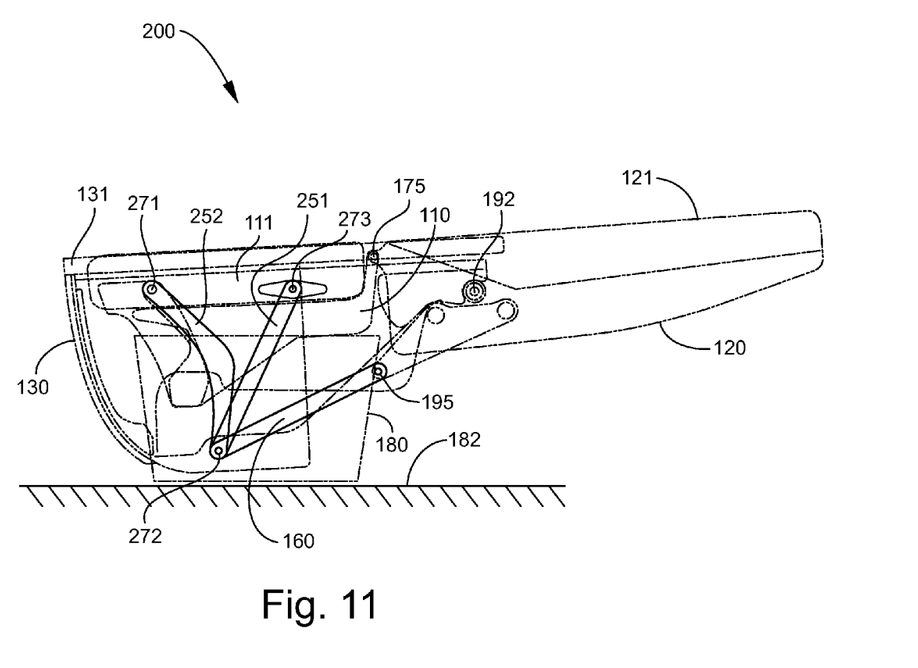
FIG. 11 illustrates a side elevation detail view of the seat recline mechanism of FIGS. 9 and 10 shown in a lie-flat position.

Referring now to FIGS. 9-11, a side elevation detail view of an armrest recline mechanism according to an alternate embodiment in respective upright, reclined and lie-flat position are illustrated. Similar to the embodiment disclosed by FIG. 1-8, the FIG. 9-11 disclose seat 200 having a seat back 120 pivotably connected to a seat pan assembly 110 and an armrest 130 pivotally connected to the seat back at arm pivot points 192. In this embodiment, as a substitute for the main linkage 150 shown in FIGS. 2-8, seat pan assembly linkage 251 and armrest linkage 252 are pivotably connected to the seat pan assembly 110, armrest 130 and secondary linkage 160. The seat pan assembly link 251 is pivotably connected to the seat pan assembly 110 at a first pivot point 271 defining a first pivot axis and pivotably connected to the secondary linkage 160 at a second pivot point 272 defining a second pivot axis; the armrest link 252 is pivotably connected to the armrest 130 at a third pivot point 273 defining a third pivot axis and pivotably connected to the secondary linkage 160 at the second pivot point 272. In this embodiment, the seat pan assembly link 251, armrest link 252, and secondary linkage 160 are all pivotable about the second pivot axis via the second pivot point 272. The secondary linkage 160 is also pivotally connected to the seat back 120 at pivot point 195. In this embodiment, the seat pan assembly link 251 and armrest link 252 may rotate with respect to each other about the second pivot axis 272. As a result, the first and third pivot points 271, 273 are independently rotatable relative to the second pivot axis 272 (compare with the unitary main linkage of FIG. 1-8 in which the geometry of the first and second pivot points 171, 172 and guide member 155 are fixed with respect to each other). This rotation permits the guide slot 173 and guide member 155 of FIG. 1-8 to be substituted with a simple pivoting connection at the third pivot point 273 while allowing the seat back 120 to freely pivot with respect to the seat pan assembly 110. As can be seen by comparing FIGS. 9-11, the armrest recline mechanism maintains the top surface of the armrest 130 and the upper surface of the seat cushion 11 in substantially parallel relationship throughout the range of motion between the upright seat position shown in FIG. 9 and the lie-flat seat position shown in FIG. 11 as the elevation of the armrest 130 relative to the seat pan 110 is automatically adjusted by the mechanism. As can be seen in FIG. 11, when the seat 200 is in its lie-flat position, the upper surfaces of the seat back cushion 121, the bottom cushion 111 and the arm pad 131 are substantially coplanar.

While a armrest recline mechanism has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A passenger seat, comprising:
   a seat back pivotally connected to one end of a seat pan;
   an armrest positioned alongside the seat pan; and
   a main link linking movement of the armrest with movement of the seat back, the main link being pivotally connected to the seat pan about a first pivot axis, connected to the armrest through a guide member and guide slot arrangement, and interconnected to the seat back through a secondary link;
   wherein a change in a degree of inclination of the seat back with respect to the seat pan causes the secondary link to drive pivoting movement of the main link about the first pivot axis, causing vertical movement of the armrest relative to the seat pan.

2. The passenger seat of claim 1, wherein the guide member of the main link slidably engages the guide slot and travels therein as the armrest moves vertically.

3. The passenger seat of claim 1, wherein the armrest comprises an armrest frame and an armpad connected to a top portion of the armrest frame.

4. The passenger seat of claim 1, wherein the seat pan comprises a seat frame and a seat cushion connected to a top portion of the seat frame.

5. The passenger seat of claim 1, wherein the seat back comprises a back frame and a back cushion connected to a front-facing portion of the back frame.

6. The passenger seat of claim 1, wherein a top surface of the seat pan, a front surface of the seat back and a top surface of the armrest are in the same plane when the passenger seat is in a flat seating position.

7. The passenger seat of claim 1, wherein:
   the armrest comprises an armrest frame, an armpad connected to a top portion of the armrest frame;
   the seat pan comprises a seat frame and a seat cushion connected to a top portion of the seat frame;
   the seat back comprises a back frame and a back cushion connected to a front-facing portion of the back frame; and
   wherein the armpad, the seat cushion and the back cushion are in the same plane when the passenger seat is in a flat seating position.

8. The passenger seat of claim 1, wherein the guide member of the main link travels within the guide slot of the armrest as the main link pivots such that the armrest moves substantially vertically and not horizontally relative to the seat pan as the seat back pivots relative to the seat pan.

9. A passenger seat, comprising:
   a seat back pivotally connected to one end of a seat pan;
   an armrest positioned alongside the seat pan;
   a triangular-shaped main link linking movement of the armrest with movement of the seat back, the main link being pivotally connected to the seat pan about a first pivot axis, interconnected with the armrest, and interconnected to the seat back through a secondary link;
   wherein pivoting movement of the seat back relative to the seat pan causes the secondary link to drive pivoting movement of the main link about the first pivot axis, thereby causing the armrest to move substantially vertically relative to the seat pan.

10. The passenger seat of claim 9, wherein the armrest comprises an armrest frame, an armpad connected to a top portion of the armrest frame.

11. The passenger seat of claim 9, wherein the seat pan comprises a seat frame and a seat cushion connected to a top portion of the seat frame.

12. The passenger seat of claim 9, wherein the seat back comprises a back frame and a back cushion connected to a front-facing portion of the back frame.

13. The passenger seat of claim 9, wherein a top surface of the seat pan, a front, surface of the seat back and a top surface of the armrest are in the same plane when the passenger seat is in a flat seating position.

14. The passenger seat of claim 9, wherein:
the armrest comprises an armrest frame, an armpad connected to a top portion of the armrest frame;
the seat pan comprises a seat frame and a seat cushion connected to a top portion of the seat frame;
the seat back comprises a back frame and a back cushion connected to a front-facing portion of the back frame; and
wherein the armpad, the seat cushion and the back cushion are in the same plane when the passenger seat is in a flat seating position.

15. The passenger seat of claim 9, wherein the main link is interconnected with the armrest through a guide member and guide slot arrangement, and wherein the guide member travels within the guide slot as the main link pivots such that the armrest moves substantially vertically and not horizontally relative to the seat pan as the seat back pivots relative to the seat pan.

* * * * *